W. F. SENTER.
Corn-Planter Attachment.
No. 202,196. Patented April 9, 1878.
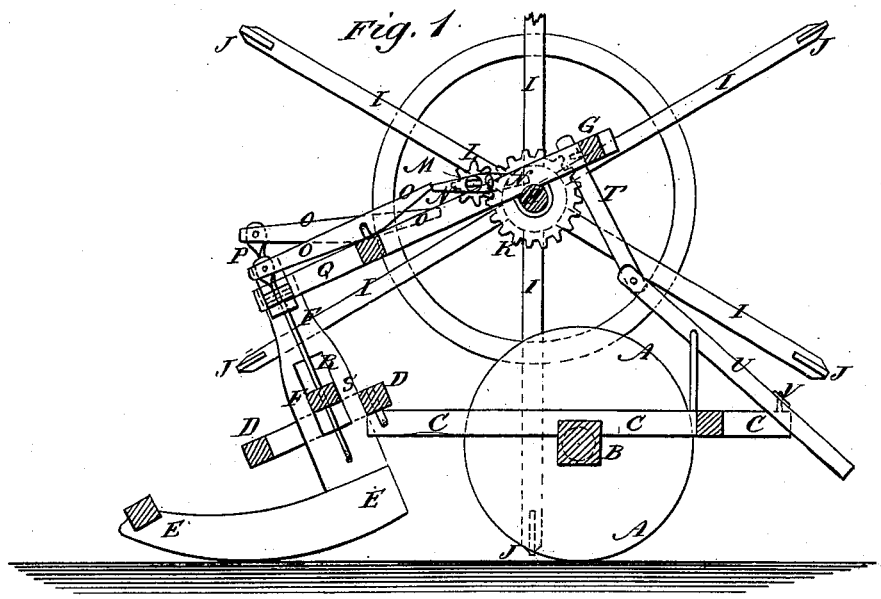
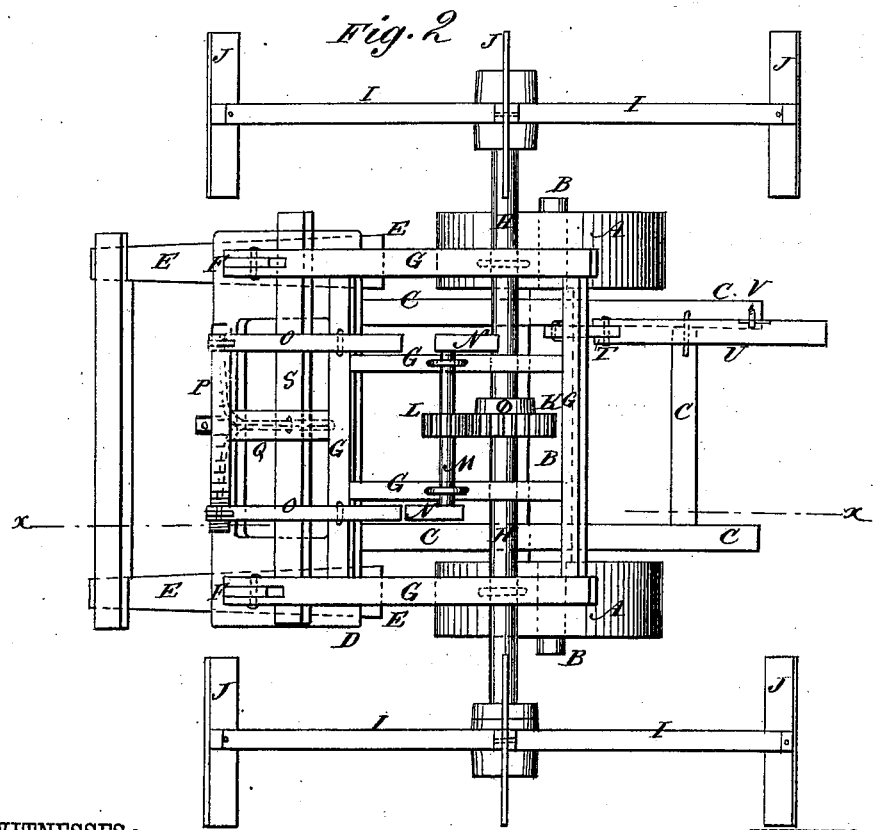
WITNESSES:
C. Neveux
J. H. Scarborough
INVENTOR:
W. F. Senter.
BY Munn & Co
ATTORNEYS.

UNITED STATES PATENT OFFICE.

WILLIAM F. SENTER, OF MARSHALL, MISSOURI.

IMPROVEMENT IN CORN-PLANTER ATTACHMENTS.

Specification forming part of Letters Patent No. 202,196, dated April 9, 1878; application filed November 23, 1877.

*To all whom it may concern:*

Be it known that I, WM. F. SENTER, of Marshall, in the county of Saline and State of Missouri, have invented a new and useful Improvement in Marking and Dropping Attachment for Corn-Planters, of which the following is a specification:

Figure 1 is a vertical longitudinal section of the frame-work of a planter to which my improvement has been applied. Fig. 2 is a top view of the same.

Similar letters of reference indicate corresponding parts.

The object of this invention is to furnish an improved attachment for corn-planters which shall be so constructed as to mark the ground as the seed is dropped, so that the planting may be done in accurate check-row, and which shall be simple in construction, convenient in use, and reliable in operation.

The invention will first be described in connection with the drawing, and then pointed out in the claims.

A are the wheels of the planter, which revolve upon the journals of the axle B. To the axle B is attached the frame C, the forward end of which is hinged to the frame or platform D, attached to the rear ends of the runners E, that open the soil to receive the seed.

To the frame or platform D, or to the seed-boxes attached to said frame or platform, are rigidly attached the lower ends of two upright bars, F, to the upper ends of which are hinged the forward ends of the side bars of the frame G. To the rear parts of the side bars of the frame G are attached bearings, in which revolves a shaft, H, to the ends of which are rigidly attached wheels I, which are made without rims and with six spokes or arms, to the outer ends of which are attached cross-knives J, to mark the ground between the rows, as a guide to the driver in the next crossing.

The wheels I may be so arranged that the knives J may mark the ground midway between the outer row last planted and the inner row to be planted at the next crossing, so that the knives of the inner wheel at each crossing may enter the marks made by the outer wheel at the preceding crossing; or the wheels I may be so arranged that the marks of the outer wheel at each crossing may be close to the outer row of hills, so that the marks of the inner wheel at the next crossing may be in line with said marks.

The spokes or arms of the wheels I are made of such a length that the distance between the adjacent knives J may be equal to the required distance apart of the hills.

To the center of the shaft H is attached a gear-wheel, K, the teeth of which mesh into the teeth of a small gear-wheel, L, attached to a short shaft, M. The shaft M revolves in bearings attached to the frame G. The gear-wheels K L are made of such a relative size that the shaft M may be revolved three revolutions at each revolution of the wheels I, and may complete each half-revolution as each arm or spoke of the wheels I comes into a vertical position upon the ground.

To the ends of the short shaft M are attached two tappets, N, which project in opposite directions, so that they may operate alternately at each half-revolution of the shaft M.

To the forward cross-bar of the frame G are pivoted two levers, O, the rear ends of which project into such a position that they may be struck and operated by the tappets N, and are beveled upon their lower sides, to diminish the friction between them and the said tappets N. The forward cross-bar of the frame G is placed at such a distance in the rear of the forward ends of the side bars of said frame that the forward ends of the said side bars and of the said levers may be in line with each other, so that there may be no binding or irregularity in the operation of the seed-dropping device as the pivoted frames C G and D E move upon each other.

To the forward ends of the levers O are pivoted the ends of a cross-lever, P, which is pivoted at its center to a spindle, Q, attached to the center of the forward cross-bar of the frame G. To the lever P is hinged the upper end of a downwardly-projecting arm, R, in such a way that it may have a forward-and-backward movement, to accommodate itself to the movements of the pivoted frames C G and D E upon each other, but can have no lateral movement.

The lower end of the hinged arm R passes through a slot in the dropping-slide S, so that the said dropping-slide may be operated to drop the seed each time an arm or spoke of the wheels I comes into a vertical position upon the ground, and so that the said dropping-slide may be moved in both directions with a positive movement. To the rear cross-bar of the frame G is hinged the upper end of a connecting-bar, T, the lower end of which is hinged to the forward end of a lever, U. The lever U is hinged to the rear cross-bar of the frame C, or to a support attached to said cross-bar, and its rear end projects into such a position that it may be readily reached and operated by the driver.

By this construction, by pressing down the rear end of the lever U, the marking-wheels I J and the runners E will be raised from the ground, stopping the operation of the seed-dropping device, and enabling the machine to be readily turned and drawn from place to place. The lever U is locked in place, when its rear end is lowered, by catching it upon a hook, V, or other catch attached to the rear end of the frame C.

Having thus described my invention, I claim as new and desire to secure by Letters Patent—

1. The combination of the wheel-frame A B C, the superposed frame G, the runner-frame D E F, pivoted to both frames, and the marker-wheel shaft H, the said shaft being connected by intermediate mechanism with dropper-slide S, as shown and described.

2. The combination, with drop-slide S, of lever P, having arm R pivoted therewith, levers O O, and tappet-shaft M, the latter operated substantially as and for the purpose set forth.

WILLIAM F. SENTER.

Witnesses:
 DEAN D. DUGGINS,
 THOS. BOUTRIGHT.